United States Patent
Dong

(10) Patent No.: US 11,014,264 B2
(45) Date of Patent: May 25, 2021

(54) CROSS-LAMINATED TIMBER PROCESSING EQUIPMENT

(71) Applicant: Jiangsu Global CLT Co., Ltd., Jiangsu (CN)

(72) Inventor: Guoliang Dong, Jiangsu (CN)

(73) Assignee: Jiangsu Global CLT Co., Ltd.

( * ) Notice: Subject to any disclaimer, the term of this patent is extended or adjusted under 35 U.S.C. 154(b) by 520 days.

(21) Appl. No.: 15/776,753

(22) PCT Filed: Nov. 29, 2017

(86) PCT No.: PCT/CN2017/113503
§ 371 (c)(1),
(2) Date: May 16, 2018

(87) PCT Pub. No.: WO2019/006969
PCT Pub. Date: Jan. 10, 2019

(65) Prior Publication Data
US 2020/0238564 A1 Jul. 30, 2020

(30) Foreign Application Priority Data

Jul. 7, 2017 (CN) .......................... 201710549345.6
Jul. 7, 2017 (CN) .......................... 201710549379.5
Aug. 10, 2017 (CN) .......................... 201710678998.4

(51) Int. Cl.
*B27G 11/00* (2006.01)
*B65G 47/34* (2006.01)
(Continued)

(52) U.S. Cl.
CPC ........ *B27G 11/005* (2013.01); *B32B 37/1284* (2013.01); *B65G 47/34* (2013.01);
(Continued)

(58) Field of Classification Search
CPC ......... B27G 11/005; B27D 1/10; B61B 13/02; B61D 15/00; B65G 47/34; Y10T 156/17; Y10T 156/1702; Y10T 156/1744
See application file for complete search history.

(56) References Cited

U.S. PATENT DOCUMENTS 4,842,669 A * 6/1989 Considine ................. E04B 1/14
156/288

OTHER PUBLICATIONS

International Searching Authority, ISR, dated Mar. 27, 2018, PCT Application No. PCT/CN2017/113503.

* cited by examiner

*Primary Examiner* — Mark A Osele
*Assistant Examiner* — Christopher C Caillouet

(57) ABSTRACT

A cross-laminated timber processing equipment comprises a longitudinal board loading mechanism, a transverse board loading mechanism, an adhesive spraying mechanism, laying cars, presses, a transfer car, and an unloading car. The longitudinal board loading mechanism lays longitudinal boards on a laying car at an assembly station, and the transverse board loading mechanism lays transverse boards on the laying car. The longitudinal boards and the transverse boards are perpendicularly and alternately laid layer by layer. The adhesive spraying mechanism is provided above the assembly station, and sprays an adhesive on the upper surfaces of assembled boards. The transfer car moves back and forth between a conveying station and an idle press through the assembly station, carries the laying cars and the assembled boards, and feeds the laying cars and the assembled boards into the presses for compaction. The unloading car moves back and forth between a press completing compaction and an unloading station, and conveys an idle laying car to the assembly station. Compared with other international similar equipment, this equipment can (Continued)

implement fully-automatic cross-laminated timber processing and production, and has low apparatus cost, high production capacity, high processing efficiency, and a great leading advantage.

24 Claims, 9 Drawing Sheets

(51) Int. Cl.
  *B61D 15/00* (2006.01)
  *B32B 37/12* (2006.01)
(52) U.S. Cl.
  CPC ......... *B32B 2317/16* (2013.01); *Y10T 156/17* (2015.01); *Y10T 156/1702* (2015.01); *Y10T 156/1744* (2015.01)

CROSS-LAMINATED TIMBER PROCESSING EQUIPMENT

FIELD

The present invention relates to cross-laminated timber processing equipment, belonging to the technical field of heavy timber structure processing.

BACKGROUND

With the release of the National New Urbanisation Plan (2014-2020) of China and the Provincial Action Plan on Green Building of Jiangsu, in the rapid urbanization process, China is expected to build 30 billion cubic meters of new houses by 2025, and a total of 6.66 billion tons of concrete, 120 million tons of steel, and 600 billion bricks need to be produced, causing great damage to the environment and ecology, and moreover, the demolition of old houses will produce lots of solid wastes. The superiority of timberwork buildings is self-evident, in line with the national energy conservation and environmental protection and social sustainable development. If the proportion of timbers used as building materials is increased to 10% in China, 326 million tons of standard coal or 472 million barrels of crude oil can be saved. This is an effective way to achieve green environmental protection and reduce energy consumption, which can greatly reduce carbon emissions and smog.

A cross-laminated timber (CLT) is a new material for wooden buildings, and is formed by cross-laminating sawn timbers of 6-9-12 meters and saw timbers having cross sections of 6-10 inches, i.e., about 18 centimeters wide and 1-1.5 inches, i.e., about 2.5-4 centimeters thick, into a large board of 2.5-3 meters wide, 12-30 centimeters thick, and 6-12 meters long. The CLT has good carrying capability, high sheet size stability, and excellent shock resistance, sound insulation and thermal insulation effects, is low-carbon and environmentally-friendly, can be used for replacing concrete materials to build houses, and can be modularly prefabricated in the factory. A large CLT is directly cut and then used as an external wall, a floor, etc. of a building. By using an on-site building block assembling method, the assembly is quick, the construction period is short, the site noise is low, no pollution is generated, no construction waste is produced, the construction efficiency of the project is greatly improved, and the labor cost is reduced.

However, because CLTs have just emerged at home and abroad, equipment for processing CLTs is still blank in China, and it is also impossible to achieve fully automated production abroad. Due to the limitations of the characteristics of the structural adhesive used, the open time is short, the assembly is very difficult, and the bonding and curing time is long, and therefore, the annual processing capability of the equipment is very low. The annual processing capacity of a piece of equipment can only reach 8000 cubic meters and cannot meet market demands.

SUMMARY

The technical problem to be solved by the present invention is to overcome the defects of the prior art. Provided is cross-laminated timber processing equipment, which doubles the processing efficiency and can achieve automated production.

To solve the technical problem above, the present invention adopts the following technical solutions.

A cross-laminated timber processing equipment comprises a longitudinal board loading mechanism, a transverse board loading mechanism, an adhesive spraying mechanism, multiple laying cars, multiple presses, as well as a transfer car and an unloading car moving along a transverse rail, wherein a longitudinal rail is perpendicularly provided at one side of the transverse rail, and one end thereof is adjacent to the transverse rail; the longitudinal board loading mechanism and the transverse board loading mechanism are provided around the longitudinal rail; the multiple presses are arranged at the other side of the transverse rail; an orifice of each press faces toward the transverse rail.

A conveying station and an unloading station are respectively located at both sides of multiple transversely arranged presses and at both ends of one transverse rail.

The longitudinal rail is provided with an assembly station; the longitudinal board loading mechanism lays longitudinal boards on a laying car at the assembly station, and the transverse board loading mechanism lays transverse boards on the laying car; the longitudinal boards and the transverse boards are perpendicular to each other, and are alternately laid layer by layer for assembly.

The adhesive spraying mechanism is provided above the assembly station, and sprays an adhesive to the upper surface of each board during assembly.

The transfer car and the unloading car can be connected with the longitudinal rail when moving to a side of the longitudinal rail along the transverse rail, so that the laying cars can travel from the assembly station onto the transfer car along the longitudinal rail to be carried by the transfer car, or the laying cars carried by the unloading car travel out of the unloading car and enter the assembly station along the longitudinal rail.

The transfer car moves among the conveying station, the assembly station, and an idle press, can carry the laying cars traveling out of the assembly station and assembled boards borne thereby to the idle press along the transverse rail, and feed the laying cars and the assembled boards into the press for compaction.

The unloading car moves between a press completing compaction and the unloading station, and conveys an idle laying car after unloading the boards at the unloading station to the assembly station.

Furthermore, each laying car comprises a pallet and traveling wheels mounted below the pallet; and the lower surface of the pallet is provided with a longitudinal rack capable of engaging with a gear.

Furthermore, a first gear driven by a first motor to rotate is provided below the assembly station; and the first gear can be engaged with the racks at the lower surfaces of the laying cars on the longitudinal rail.

Furthermore, the transfer car/unloading car is respectively provided with a gear driven by a motor to rotate; and the gear can be engaged with the racks at the lower surfaces of the laying cars traveling into or out of the transfer car/unloading car.

Furthermore, fourth gears driven by fourth motors to rotate are provided in the presses; and the fourth gears can be engaged with the racks at the lower surfaces of the laying cars traveling into or out of the transfer car/unloading car.

Furthermore, the transverse board loading mechanism is provided at the other end of the longitudinal rail, and the longitudinal board loading mechanism is provided at a side of the longitudinal rail.

Furthermore, the longitudinal board loading mechanism comprises a stacking frame provided at a side of the longitudinal rail, and a prong capable of being driven by a driving device to move above the stacking frame and the assembly station; either end of the stacking frame is respectively provided with a stop plate at the side close to the assembly station; and the stop plates block the longitudinal boards stacked on the stacking frame, and spaces below the stop plates can allow only the lowermost longitudinal board to pass through.

Furthermore, the transverse board loading mechanism comprises a laying car located above the assembly station and a conveyor belt capable of rotating while moving relative to the laying car.

Furthermore, the upper surface of the stacking frame is provided with multiple lining bars; a space capable of allowing the prong to extend into is formed between the longitudinal boards stacked on the stacking frame and the upper surface of the stacking frame by means of the multiple lining bars.

Furthermore, the equipment further comprises an adjusting mechanism provided around the assembly station to adjust and align the longitudinal boards and/or the transverse boards.

Furthermore, the adjusting mechanism comprises a supporting frame, and an adjusting frame hingedly connected to the supporting frame and capable of being driven by a first air cylinder or a first hydraulic cylinder to turn over.

Furthermore, the transverse board loading mechanism and the longitudinal board loading mechanism are provided at both sides of the longitudinal rail, respectively.

Furthermore, at least one gantry spanning across the transverse board loading mechanism and the longitudinal board loading mechanism is mounted above the laying car at the assembly station on the longitudinal rail; a moving frame capable of moving along a rail on the gantry is provided on the gantry; manipulators capable of being driven by a driving mechanism to stretch or retract downwardly is carried on the moving frame; and the front ends of the manipulators are provided with multiple vacuum chucks capable of absorbing the boards.

Furthermore, a total of one or two mobile frames are provided on the gantry for loading and assembling.

Furthermore, when one mobile frame is provided, the mobile frame alternately moves between the longitudinal board loading mechanism and the laying car and between the transverse board loading mechanism and the laying car, and carries the manipulators having the vacuum chucks to alternately move the longitudinal boards on a longitudinal board laying platform and the transverse boards on a transverse board laying platform onto the laying car layer by layer for assembly of a cross-laminated timber (CLT).

Furthermore, when two moving frames are provided, the two moving frames alternately move along the same rail or different rails of the same gantry, or alternately move along two rails on different gantries; one of the moving frames moves between the longitudinal board loading mechanism and the laying car, and the other moving frame moves between the transverse board loading mechanism and the laying car; and the manipulators having the vacuum chucks and carried by the moving frames alternately lay the longitudinal boards and the transverse boards on the laying cars layer by layer for assembly of the CLT.

Furthermore, the transverse board loading mechanism comprises the transverse board laying platform and a conveyor belt located adjacent to the transverse board laying platform for conveying the transverse boards; a conveying manipulator having a vacuum chuck is provided at the joint between the transverse board laying platform and the conveyor belt; and the transverse boards on the conveyor belt are moved by the conveying manipulator to the transverse board laying platform.

Furthermore, the longitudinal board loading mechanism comprises the longitudinal board laying platform and a conveyor belt located adjacent to the longitudinal board laying platform for conveying the longitudinal boards; a conveying manipulator having a vacuum chuck is provided at the joint between the longitudinal board laying platform and the conveyor belt; and the longitudinal boards on the conveyor belt are moved by the conveying manipulator to the longitudinal board laying platform.

Furthermore, the starting ends of the conveyor belt for conveying the transverse boards and/or the conveyor belt for conveying the longitudinal boards are provided with a loading manipulator for loading the transverse boards and/or the longitudinal boards onto the conveyor belt; and the front end of the loading manipulator is provided with multiple vacuum chucks.

Furthermore, the longitudinal board loading mechanism comprises a conveyor belt and a longitudinal board moving frame; and a layer of longitudinal boards on the conveyor belt are vacuum-sucked up and moved by the longitudinal board moving frame and a manipulator having a vacuum chuck carried thereon to the laying car at the assembly station and then are released, so that the layer of longitudinal boards are horizontally laid on the laying car.

Furthermore, a jacking hydraulic cylinder or air cylinder is further provided on the unloading car, and a stretchable rod of the jacking hydraulic cylinder or air cylinder moves vertically; and the pallet of the laying car is correspondingly provided with a through hole capable of allowing the stretchable rod to stretch out.

Furthermore, the equipment further comprises a film covering mechanism; after first assembly, the upper surface of the assembled boards formed by the first assembly is covered with a thin film by the film covering mechanism, and then second assembly is performed after overlapping, so that the assembled boards formed by the first assembly and the second assembly are isolated by means of the thin film.

Furthermore, the equipment further comprises an arrangement mechanism provided around the assembly station and/or in the press to adjust and align the longitudinal boards and the transverse boards.

The present invention achieves the following beneficial effects: the cross-laminated timber processing equipment of the present invention can implement automated cross-laminated timber processing and production. Compared with other international similar equipment, the equipment has low apparatus cost, high production capacity, high processing efficiency, and great technological leading advantage at home and abroad because a piece of equipment can achieve annual processing capacity of 60 thousand cubic meters or more.

DETAILED DESCRIPTION

The present invention is further descried blow in combination with the accompanying drawings. The following embodiments are merely used for more clearly describing the technical solutions of the present invention, and are not intended to limit the scope of protection of the present invention.

Embodiment 1

Figure 1:
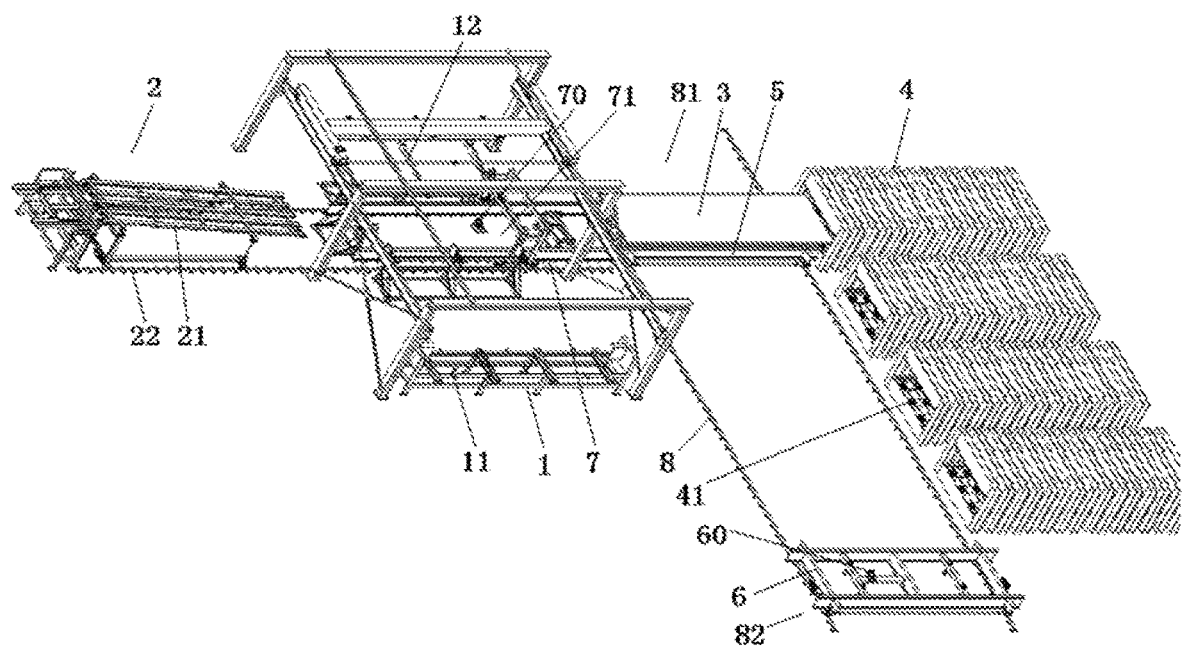
FIG. 1 is a schematic diagram of equipment of the present invention.

As illustrated in FIG. 1, cross-laminated timber processing equipment of the present invention comprises a longitudinal board loading mechanism 1, a transverse board loading mechanism 2, an adhesive spraying mechanism, multiple laying cars 3, multiple presses 4, a transfer car 5, and an unloading car 6.

A longitudinal rail 7 is provided at one side of a transverse rail 8, one end thereof is perpendicular and close to the transverse rail 8, and the other end is provided with the transverse board loading mechanism 2; the longitudinal board loading mechanism 1 is provided at a side of the longitudinal rail 7. The multiple presses 4 are arranged at the other side of the transverse rail 8, and an orifice 41 of each press 4 faces toward the transverse rail 8. The longitudinal rail 7 is provided with an assembly station 71; a laying car can move from the assembly station 71 towards transverse rail 8 along the longitudinal rail 7, and is carried by the transfer car 5 that moves on the transverse rail 8 and is connected with the longitudinal rail 7.

Figure 2:
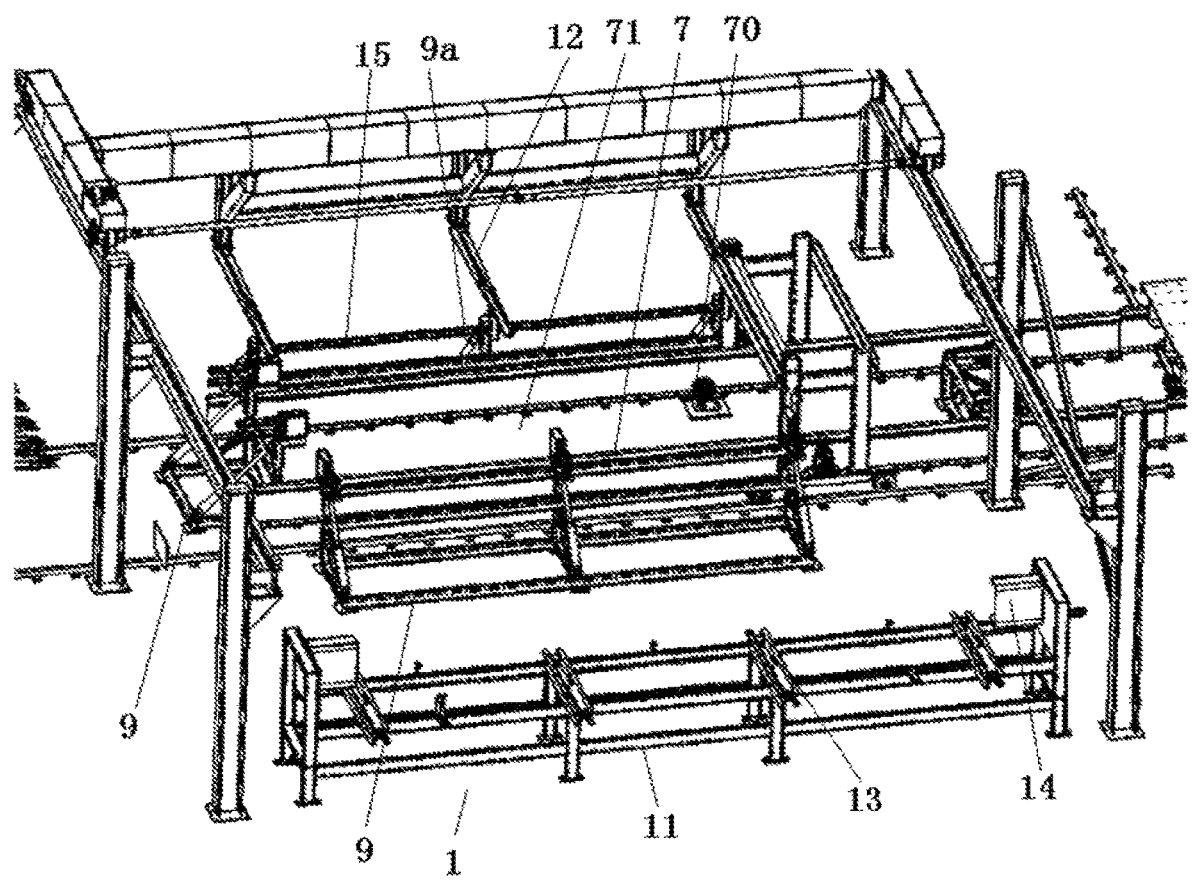
FIG. 2 is a schematic diagram of a longitudinal board loading mechanism at an assembly station in FIG. 1.

As illustrated in FIG. 2, the longitudinal board loading mechanism 1 comprises a stacking frame 11 provided at a side of the longitudinal rail 7, and a prong 12 capable of being driven by a driving device to move above the stacking frame 11 and the assembly station 71. A large number of longitudinal boards are stacked on the stacking frame 11. In order to take up the longitudinal boards by the prong 12 conveniently, the upper surface of the stacking frame 11 is provided with multiple lining bars 13; a gap is formed between the longitudinal boards and the upper surface of the stacking frame 11 by means of the multiple lining bars 13 for the prong 12 to extend into. Either end of the stacking frame 11 is respectively provided with a stop plate 14 at the side close to the assembly station 71; the stop plates 14 block the longitudinal boards stacked on the stacking frame 11, and spaces below the stop plates 14 can allow only the lowermost longitudinal board to pass through. When the prong 12 extends into the gap between the longitudinal boards and the stacking frame 11 from one side of the assembly station 71, the driving device located at the other side of the stacking frame 11 acts to push the lowermost longitudinal board onto the prong 12. Due to the stopping of the stop plates 14, only the lowermost longitudinal board is taken away by the prong 12, and the remaining longitudinal boards are still located on the stacking frame 11 due to the stopping of the stop plates 14, and therefore, the prong 12 only takes away one longitudinal board each time. The prong 12 carries the fetched longitudinal board and retreats to a position above the assembly station 71, and when the prong 12 continues retreating, a stop rod 15 provided at the other side of the assembly station 71 on the longitudinal rail 7 stops the longitudinal board, so that the longitudinal board is separated from the prong 12 as the prong 12 continues retreating and falls onto the laying car on the longitudinal rail 7 at the assembly station 71, thereby completing the loading of one longitudinal board (to avoid covering of the laying car, the laying car is not shown on the longitudinal rail 7 at the assembly station 71 in FIG. 2).

The transverse loading mechanism 2 comprises a laying car located above the assembly station 71 and a conveyor belt 21 capable of rotating while moving relative to the laying car, i.e., both a conveyor belt 21 movement mode and a laying car movement mode can be used.

When the conveyor belt 21 movement mode is used, a loading rail 22 is provided, and the conveyor belt 21 can move along the loading rail 22. The loading rail 22 has a width greater than that of the longitudinal rail 7, and is arranged in the same direction as the longitudinal rail 7 to surround the longitudinal rail 7, so that the conveyor belt 21 can cover the assembly station 71 on the longitudinal rail 7 when moving along the loading rail 22. A layer of transverse boards are arranged on the conveyor belt 21; when the conveyor belt 21 moves towards the assembly station 71 along the loading rail 22 and arrives at the position above the assembly station 71, the conveyor belt 21 rotates at the same time, and the transverse boards on the conveyor belt 21 fall from the front end of the conveyor belt 21 in sequence; with the continuous forward movement of the conveyor belt along the loading rail 22 and the rotation of the conveyor belt, the fallen transverse boards are arranged on the laying car at the assembly station 71 in sequence, so that the loading of the layer of transverse boards is completed. After the loading of the layer of transverse boards is completed, the conveyor belt 21 retreats to the original position. This loading process is advancing loading.

In other implementation modes, the conveyor belt 21 can also move towards the assembly station 71 along the loading rail 22 to the forefront of the assembly station 71; the conveyor 21 rotates while retreating along the loading rail 22, and the transverse boards on the conveyor belt 21 fall from the front end of the conveyor belt 21 in sequence; with the retreating movement of the conveyor belt along the loading rail 22 and the rotation of the conveyor belt, the fallen transverse boards are arranged on the laying car at the assembly station 71 in sequence, so that the loading of a layer of transverse boards is completed. After the loading of a layer of transverse boards is completed, if the conveyor belt 21 still does not retreat to the original position, the conveyor belt continues retreating to the original position. This loading process is retreating loading.

In other implementation modes, the advancing loading and the retreating loading can be combined to implement both advancing and retreating loading, thereby improving the loading efficiency.

When the laying car movement mode is used, the position of the conveyor belt 21 is fixed. The laying car moves from the assembly station 71 to a position below the conveyor belt 21 along the longitudinal rail 7. With the movement of the laying car, the conveyor belt 21 rotates at the same time, and the transverse boards on the conveyor belt 21 fall from the front end of the conveyor belt 21 in sequence and are arranged on the laying car, so that the loading of a layer of transverse boards is completed. Afterwards, the laying car returns to the assembly station 71 along the longitudinal rail 7.

The adhesive spraying mechanism is provided above the assembly station 71 (not shown). The adhesive spraying mechanism can employ a large number of adhesive spraying heads completely covering the assembly station 71. According to a range needing adhesive spraying and an adhesive spraying amount, adhesive spraying heads within a corresponding range and a flow rate can be enabled. The adhesive spraying mechanism can also use a movable adhesive spraying frame; the adhesive spraying frame is provided with one or more rows of adhesive spraying heads; according to the range needing adhesive spraying, the movement of the adhesive spraying frame is controlled in such a way that the movement range of the adhesive spraying frame covers the range needing adhesive spraying; the adhesive spraying amount can be controlled and adjusted through the flow rate of the spraying heads.

After the longitudinal board loading mechanism 1 completes the loading of a layer of longitudinal boards, the adhesive spraying mechanism sprays an adhesive to the upper surface of the layer of longitudinal boards, and then the transverse board loading mechanism lays a layer of transverse boards perpendicular to the longitudinal boards on the adhesive-sprayed longitudinal boards. At this time, the assembly of three layers of cross-laminated timbers in this embodiment is formed. In other implementation modes, if more layers of cross-laminated timber are to be assembled, the process above is repeated to alternately assemble the longitudinal boards and the transverse boards.

A conveying station 81 and an unloading station 82 are respectively located at both sides of multiple transversely arranged presses 4 and at both ends of one transverse rail 8.

Both the transfer car 5 and the unloading car 6 move on the transverse rail 8. When compaction in one of the presses 4 is completed, first, the unloading car 6 moves from the unloading station 82 to the orifice 41 of the press 4 along the transverse rail 8 to take away the laying car in the press 4 and a finished product of compacted cross-laminated timber on the laying car and carry them to the unloading station 82 to unload the compacted cross-laminated timber, so that the press 4 becomes an idle press; and then, the transfer car 5 travels out of the conveying station 81 to a position beside the assembly station 71 to convey another laying car at the assembly station 71 and the assembled cross-laminated timber thereon into the idle press. The unloading car 6 moves only on the transverse rail 8 between the unloading station 82 and the press 4, and the transfer car 5 moves only on the transverse rail 8 from the conveying station 81 to the idle press 4 through a possible beside the assembly station 71, thereby preventing the transfer car 5 and the unloading car 6 from interfering with each other during movement.

Since the laying cars 3 need to longitudinally move out of the assembly station 71 from the assembly station 71 and then move into the multiple transversely arranged presses 4 for compaction of the assembled cross-laminated timbers borne thereon, and the laying cars 3 also need to transversely move the finished product formed by compaction and borne in each press 4 to the unloading station 82 for unloading and then returns to the assembly station 71, the movement routes of the laying cars are completed, and the laying cars need to move back and forth among multiple stations, the transfer car 5, the unloading car 6, and the presses 4. Therefore, an ordinary movable car having a driving device is not suitable, and power-taking wiring of the driving device is hard to ensure electricity safety in a timber production environment. A track power taking approach also has lots of disadvantages; because frequent movement and friction of the cars on the rail easily lead to sparks, this approach is also not suitable for an inflammable production environment in which lots of timbers and adhesive exist. Moreover, because the cross-laminated timbers carried on the laying cars have relatively heavy weight, a power supply approach of using storage batteries still cannot meet the production requirements. Therefore, the laying cars 3 used in the present invention are not provided with driving devices so as to avoid the difficulty of electricity deployment, while the lower surface of the pallet 31 of each laying car 3 is provided with a longitudinal rack capable of engaging with a gear. The laying cars 3 only move longitudinally, and during transverse movement, the laying cars all longitudinally move onto the transfer car 5 or the unloading car 6, so that the transfer car 5 or the unloading car 6 carries the laying cars to move along the transverse rail 8 to implement transverse movement.

Four or more traveling wheels are mounted below the pallet. Preferably, the rack is provided on a longitudinal center line of the lower surface f the pallet.

A first gear 70 driven by a first motor to rotate is provided between the longitudinal rails 7 below the assembly station 71; the first gear can be engaged with the racks at the lower surfaces of the laying cars on the longitudinal rail 7. Preferably, the first gear is provided on the longitudinal center line of the longitudinal rail 7. The first gear can be directly provided on an output shaft of the first motor.

The transfer car 5 is provided with a second gear driven by a second motor to rotate (in FIG. 1, the laying car 3 is located on the transfer car 5, the second gear is covered and not shown, and the structure of the transfer car 5 may refer to the unloading car 6); the second gear can be engaged with the racks at the lower surfaces of the laying cars traveling in or out of the transfer car 5. Preferably, the second gear is provided on the longitudinal center line of the transfer car 5. The second gear can be directly provided on an output shaft of the second motor.

Figure 3:
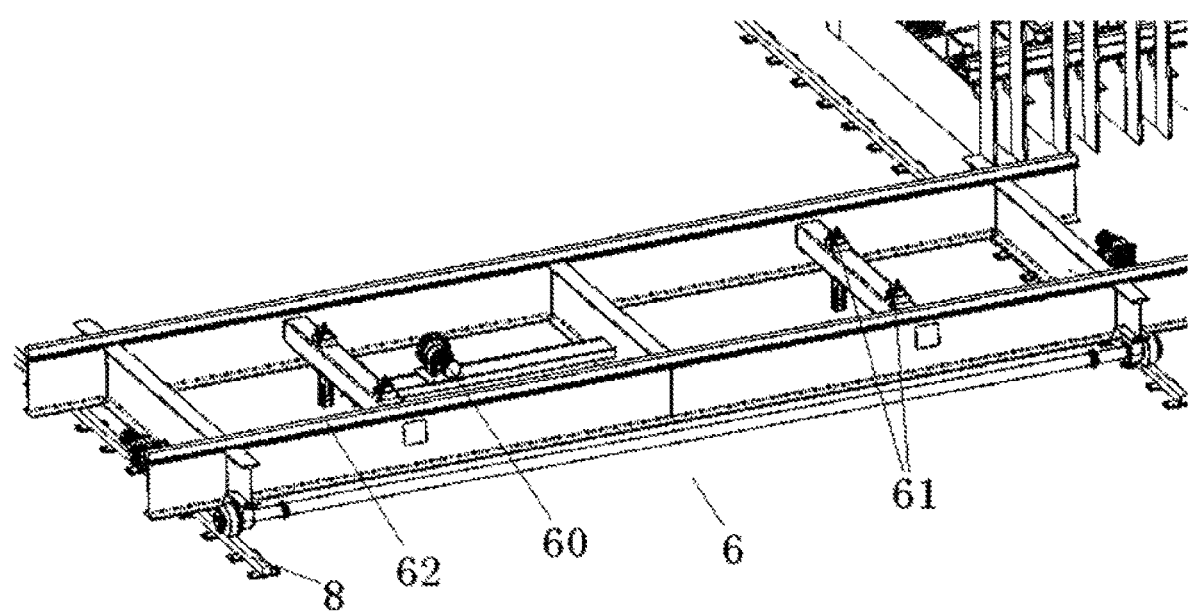
FIG. 3 is a schematic diagram of an unloading car in FIG. 1.

As illustrated in FIG. 3, the unloading car 6 is provided with a third gear 60 driven by a third motor to rotate, and the third gear 60 can be engaged with the racks at the lower surfaces of the laying cars traveling in or out of the unloading car 6. Preferably, the third gear is provided on the longitudinal center line of the unloading car 6. The third gear 60 can be directly provided on an output shaft of the third motor. The unloading car 6 is further provided with a jacking hydraulic cylinder 61, and a stretchable rod of the jacking hydraulic cylinder 61 moves vertically; the pallet of the laying car is correspondingly provided with a through hole capable of allowing the stretchable rod to stretch out; the stretchable rod of the jacking hydraulic cylinder can jack up the assembled finished product borne by the laying car carried on the unloading car 6 when stretching out upwardly, so that an unloading forklift extends into the bottom of the assembled finished product to take up the assembled finished product for unloading.

Figure 4:
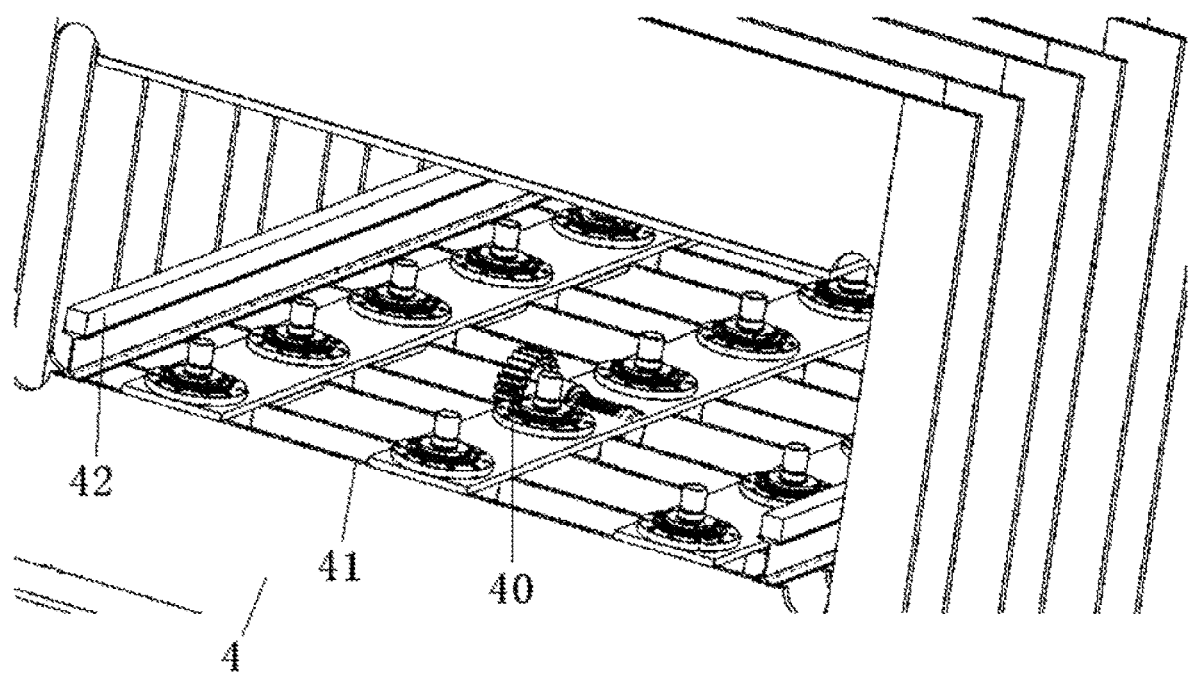
FIG. 4 is a schematic diagram of an orifice of a press in FIG. 1.

As illustrated in FIG. 4, fourth gears 40 driven by fourth motors to rotate are provided in the presses 4; the fourth gears 40 can be engaged with the racks at the lower surfaces of the laying cars traveling into or out of the presses 4. Preferably, the fourth gears are provided on the longitudinal center lines of the presses 4. The third gears 40 can be directly provided on output shafts of the fourth motors.

The transfer car 5 and the unloading car 6 move only along the transverse rail 8, and therefore respectively use ordinary motors as driving devices to implement movement.

The transfer car 5 and the unloading car 6 are the same in structure. On the basis that the bearing capacity requirement is satisfied, in order to decrease dead weight and reduce driving force, the transfer car 5 and the unloading car 6 can be configured as a frame structure, comprising two longitudinal side frames 62 capable of bearing the traveling wheel of the laying cars; the longitudinal side frames are connected by means of transverse side frames. The distance between the two longitudinal side frames is equal to the distance between the longitudinal rails 7 and the distance between press rails 42 in the presses 4, so that the transfer car 5 or the unloading car 6 can be in butt joint with the longitudinal rail 7 when moving to the position beside the assembly station 71, and the traveling wheels of the laying car can thus smoothly transition on the longitudinal rail 7 and the transfer car 5 or the unloading car 6.

After any press 4 completes compaction, the unloading car 6 moves out of the unloading station 82 along the transverse rail 8 to the orifice of the press 4; at this time, the fourth motor in the press 4 is started to rotate reversely and drives the fourth gear to rotate; the fourth gear drives the rack engaged therewith to move the laying car and drive the laying car to travel out of the press 4. Meanwhile, the third motor on the unloading car 6 is started to rotate reversely and drives the third gear to rotate, so that the rotating third gear continues to drive the laying car to move when the rack below the laying car is engaged with the third gear; at this time, the fourth motor can be shut down (can also be delayed to be shut down together with the third motor) until the laying car is completely separated from the orifice of the press 4 and completely carried by the unloading car 6. At this time, the third motor is shut down (the fourth motor can be delayed to this time and shut down together with the third motor) so that the laying car remains relatively stationary on the unloading car 6. The press 4 becomes an idle press 4 and waits for goods delivered by the transfer car 5. The unloading car 6 carries the laying car and the assembled finished product thereon to move along the transverse rail 8 to the unloading station 82; the jacking hydraulic cylinder on the unloading car 6 moves to jack up the finished product, and the unloading forklift takes way the assembled finished product. After the unloading car 6 unloads the compacted cross-laminated timbers at the unloading station 82, the laying car carried thereon becomes empty; after the transfer car 5 returns to the conveying station 81, the unloading car 6 carries the empty laying car to move along the transverse rail 8 to the longitudinal rail 7; the empty laying car continues to move along the longitudinal rail 7 to the assembly station 71 to perform the next round of assembly. The empty unloading car 6 can return to the unloading station 82, or does not need to return and continues to wait here for repeating the pickup process above after the completion of the compaction of any one press 4.

When there is an idle press 4, the transfer car 5 travels out of the conveying station 81 and moves along the transverse rail 8 to the longitudinal rail 7 to be in butt joint with the longitudinal rail 7; at this time, the first gear and the second gear are located on one trajectory; the first motor at the assembly station 71 is started to rotate forwardly and drives the first gear to rotate, so that the rack engaged with the first gear is driven to move the laying car at the assembly station 71 towards the transfer car 5 along the longitudinal rail 7 by means of gear transmission. When the laying car moves and begins to enter a space above the transfer car 5, the second motor on the transfer car 5 is started to rotate forwardly, so that the rotating second gear continues to drive the laying car to move when the rack below the laying car is engaged with the second gear; at this time, the first motor can be shut down (can also be delayed to be shut down together with the second motor) until the laying car is completely separated from the longitudinal rail 7 and travels onto the transfer car 5 to be completely carried by the transfer car 5 (FIG. 1 is a schematic diagram showing a laying car that is completely carried by the transfer car 5). At this time, the second motor is shut down (the first motor can be delayed to this time and shut down together with the second motor), so that the laying car remains relatively stationary on the transfer car 5. The transfer car 5 carries the laying car and the assembled boards thereon, and moves along the transverse rail 8 to an idle press 4 and then stops; at this time, the second motor on the transfer car 5 is started again to rotate forwardly, and drives the second gear to drive the rack engaged therewith to move the laying car, so that the laying car is driven to move towards the orifice of the press 4 and enter the press 4 from the orifice. At this time, the fourth motor in the press 4 is started and drives the fourth gear to rotate, so that the rotating fourth gear continues to drive the laying car to move when the rack below the laying car is engaged with the fourth gear. Meanwhile, the second motor can be shut down (can also be delayed to be shut down together with the fourth motor) until the laying car is completed separated from the transfer car 5 and travels into the press 4 to be completely carried by the press 4; at this time, the fourth motor is shut down (the second motor can be delayed to this time and shut down together with the fourth motor). After completing this delivery task, the transfer car 5 travels back to the initial conveying station 81 to wait for repeating the delivery process above next time when there is an idle press 4.

When the equipment of the present invention is started for the first time, assembly performed continuously first, the transfer car 5 carries the laying car and the assembled boards thereon into each press 4 in sequence, and the multiple presses 4 are filled in sequence for compaction. Therefore, the number of the laying cars meets a condition that each press 4 needs a laying car, and one more laying car is needed to carry the assembled boards at the assembly station 71, and therefore, the number of the laying cars is the number of the presses 4 plus one. The number of the presses 4 used in this embodiment is four, and accordingly, the number of the laying cars is five. The compaction time of the presses 4 is limited by the curing time of the adhesive, and therefore, multiple presses 4 are used for compaction; the compaction time can be fully utilized for assembly, so that the assembly and the compaction form a good cycle, thereby avoiding the idleness of personnel and equipment, and greatly improving the working efficiency.

Embodiment 2

In this embodiment, the positions and structures of the longitudinal board loading mechanism 1 and the transverse board loading mechanism 2 in Embodiment 1 are changed, and a loading approach of using manipulators having vacuum chucks is adopted.

Figure 7:
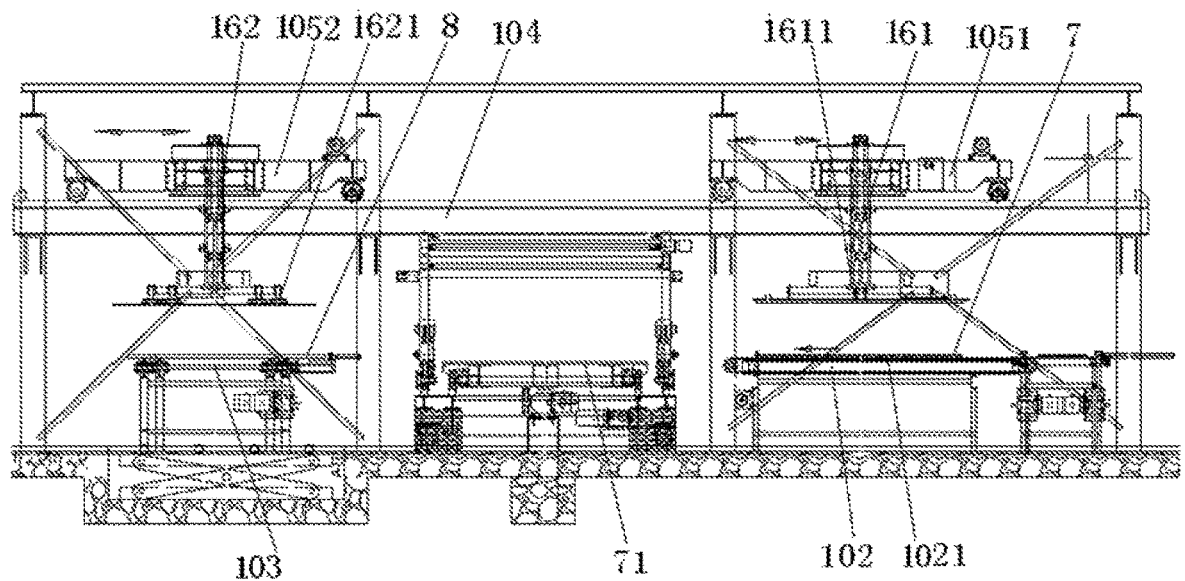
FIG. 7 is a front view of a loading manipulator having vacuum chucks of another embodiment.
Figure 8:
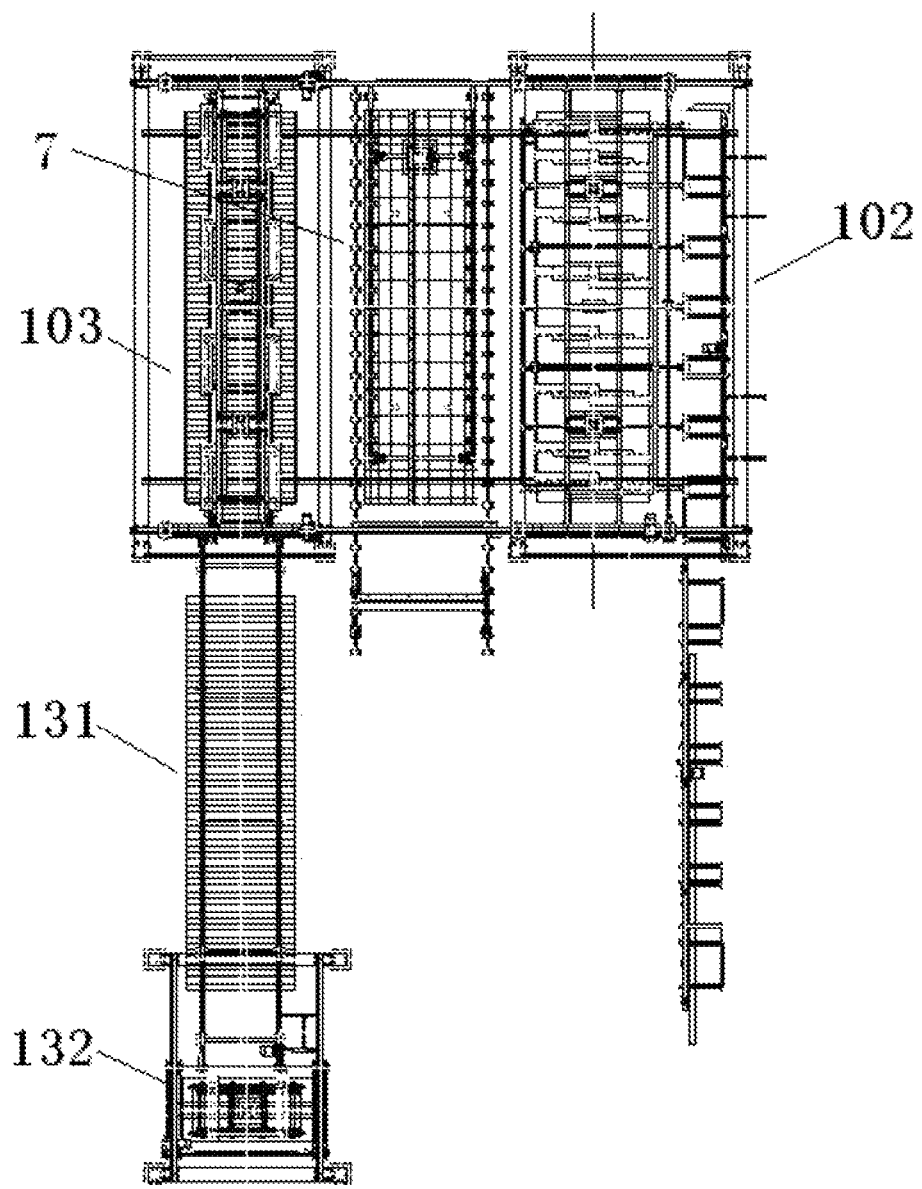
FIG. 8 is a top view of FIG. 7.
Figure 9:
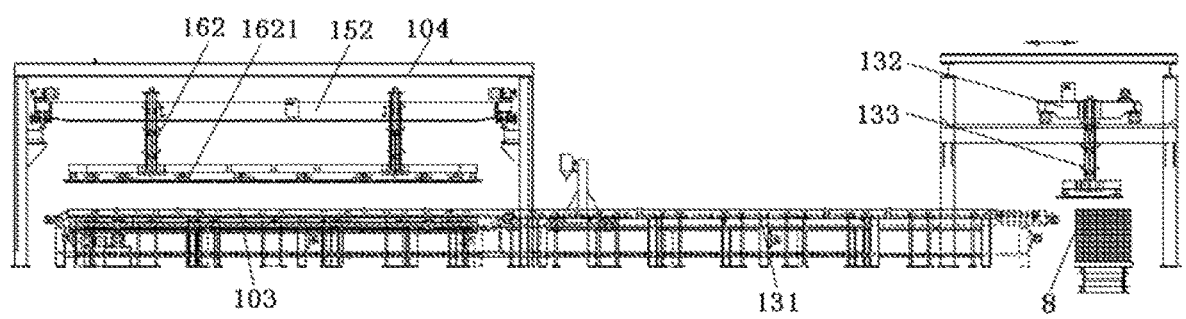
FIG. 9 is a left view of FIG. 7.

As illustrated in FIGS. 7, 8, and 9, in this embodiment, a transverse board loading mechanism 103 and a longitudinal board loading mechanism 102 are respectively provided at both sides of a longitudinal rail 7. A gantry 104 spanning across the transverse board loading mechanism 103 and the longitudinal board loading mechanism 102 is mounted above a laying car at an assembly station 71 on the longitudinal rail. Two moving frames 1051 and 1052 alternately moving along a rail on the gantry are provided on the gantry 104; manipulators 161 and 162 capable of being driven by a driving mechanism to stretch or retract downwardly is carried on the moving frame 105; the front ends of the manipulators 161 and 162 are provided with multiple vacuum chucks 1611 and 1621 capable of absorbing the boards, and can be vacuum-absorbed on multiple longitudinal boards 7 or transverse boards 8. The two moving frames 1051 and 1052 alternately move along the same rail or different rails on the gantry. One moving frame 1051 moves between the longitudinal board loading mechanism 102 and the laying car at the assembly station 71, and the other moving frame 1052 moves between the transverse board loading mechanism 103 and the laying car at the assembly station 71. The manipulators 161 and 162 having the vacuum chucks and carried by the moving frames alternately lay the longitudinal boards 7 and the transverse boards 8 on the laying cars layer by layer for assembly of the CLT.

A gantry is configured in this embodiment and is provided with two moving frames for loading and assembling. In other implementation modes, two gantries can also be configured and are respectively provided with a moving frame.

The moving frames are driven by a motor or hydraulically to move along the rail on the gantry.

The transverse board loading mechanism 103 comprises a transverse board laying platform and a conveyor belt 131 located adjacent to the transverse board laying platform for conveying the transverse boards; a conveying manipulator having a vacuum chuck is provided at the joint between the transverse board laying platform and the conveyor belt. The conveying manipulator can adsorb multiple transverse boards horizontally laid on the conveyor belt at a time to move to the transverse board laying platform.

The loading of the transverse boards to the conveyor belt 131 can also be performed using a moving frame 132; a loading manipulator 133 capable of being driven by a driving mechanism to stretch or retract downwardly is carried on the moving frame 132. The front end of the loading manipulator 133 is provided with multiple vacuum chucks. A layer of transverse boards 8 can be vacuum-absorbed onto the conveyor belt.

The longitudinal boards 7 can be conveyed in the same way as the transverse boards. However, because the longitudinal boards are generally longer and wider than the transverse boards, turnover processes should be reduced as far as possible. Therefore, the longitudinal board laying platform can also be directly configured as a conveyor belt 1021; a layer of longitudinal boards on the conveyor belt are vacuum-sucked up and moved by the longitudinal board moving frame and the manipulator having vacuum chucks carried thereon to the laying car and then are released, so that the layer of longitudinal boards are horizontally laid on the laying car.

The remaining structures are the same as those in Embodiment 1.

Embodiment 3

On the basis of Embodiment 1 or Embodiment 2, to further improve the working efficiency, after assembly is completed on the laying car at the assembly station 71, overlapping can be continued thereon to continuously perform the next assembly. In order to avoid mutual influence between the two assemblies during compaction, the equipment of the present invention is further provided with a film covering mechanism (not shown). After first assembly, the upper surface of the cross-laminated timber formed by the first assembly is covered with a thin film by the film covering mechanism, and then second assembly is performed after overlapping, so that the cross-laminated timbers formed by the first assembly and the second assembly are isolated by means of the thin film. The rest are the same as those in Embodiment 1.

In other implantation modes, multiple assemblies can also be performed on the same laying car, and can be implemented just by repeating the process above. However, it is necessary to ensure that the laying car and the assembled boards have a total height allowing freely entering and exiting the orifice of the presses 4, and do not exceed the workload of the presses 4 and can meet the compaction requirement in the presses 4.

Embodiment 4

Figure 5:
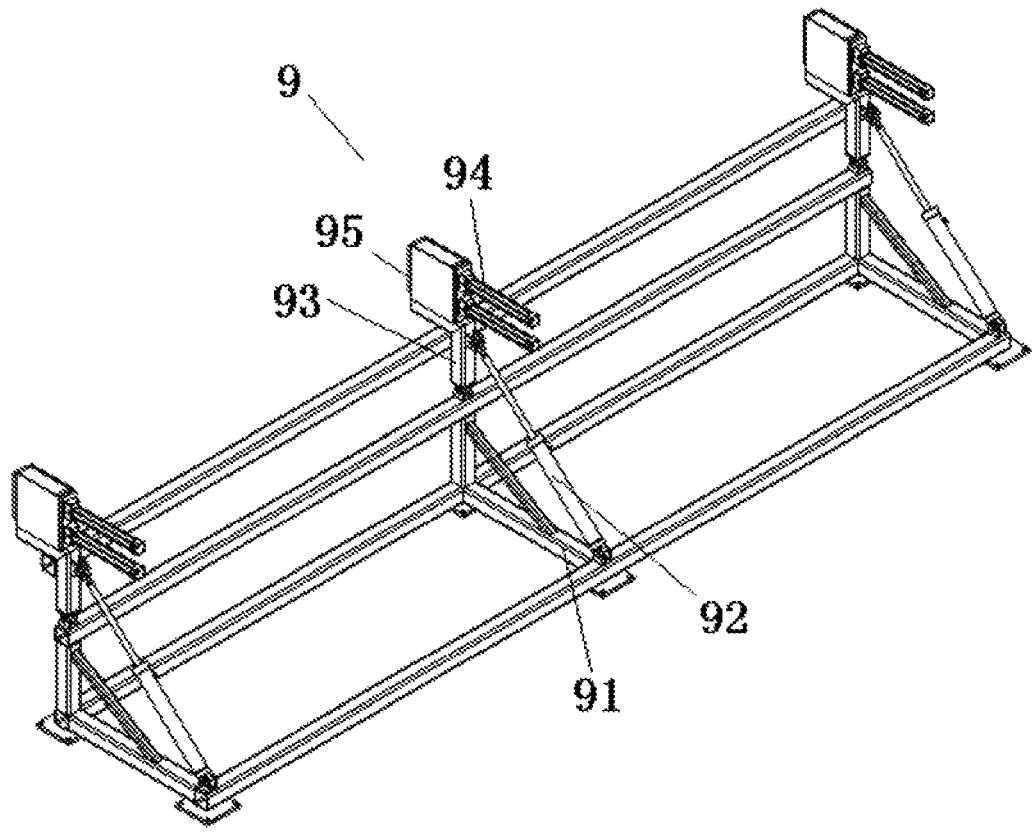
FIG. 5 is a schematic diagram of an adjusting mechanism of an embodiment.

As illustrated in FIGS. 2 and 5, on the basis of Embodiment 1, Embodiment 2, or/and Embodiment 3, to further ensure the orderliness of each layer of transverse boards and longitudinal boards and assembled boards, multiple adjusting mechanisms 9 are further provided around the assembly station 71. Each adjusting mechanism 9 comprises a supporting frame 91, and an adjusting frame 93 hingedly connected to the supporting frame and capable of being driven by a first hydraulic cylinder 92 to turn over. A fixed end of the first hydraulic cylinder 92 is fixed on the supporting frame, and a stretchable end is hingedly connected to the adjusting flame 93. The adjusting frame 93 is provided with an adjusting block 95 capable of being driven by the second hydraulic cylinder 94 to move. The rest are the same as those in embodiments 1 and 2.

When the first hydraulic cylinder 92 retracts, the adjusting frame 93 is driven to turn over downwardly to a height lower than that of the laying car at the assembly station 71, so as to avoid the impact on the loading of the transverse boards or the longitudinal boards. When the first hydraulic cylinder 92 stretches, the adjusting frame 93 is driven to turn over upwardly to a height higher than that of the laying car at the assembly station 71, and is located around the transverse boards or the longitudinal boards on the laying car, or is located around the assembled boards formed by cross lamination of the transverse boards and the longitudinal boards after adhesive spraying. At this time, the second hydraulic cylinder 94 acts and drives the adjusting block 95 to move towards the transverse boards or longitudinal boards or the assembled boards to extrude and adjust the transverse boards or longitudinal boards or the assembled boards, so that the transverse boards or longitudinal boards or the assembled boards can be arranged more orderly. Those skilled in the art can know that the adjusting mechanism can act multiple times, i.e., performs an adjustment after each layer of cross-laminated timbers are loaded, and performs an adjustment again after the final assembly. The timing and number of adjustments can also be set selectively, in order to ensure orderly arrangement and avoid the waste of working time caused by multiple adjustments.

Figure 6:
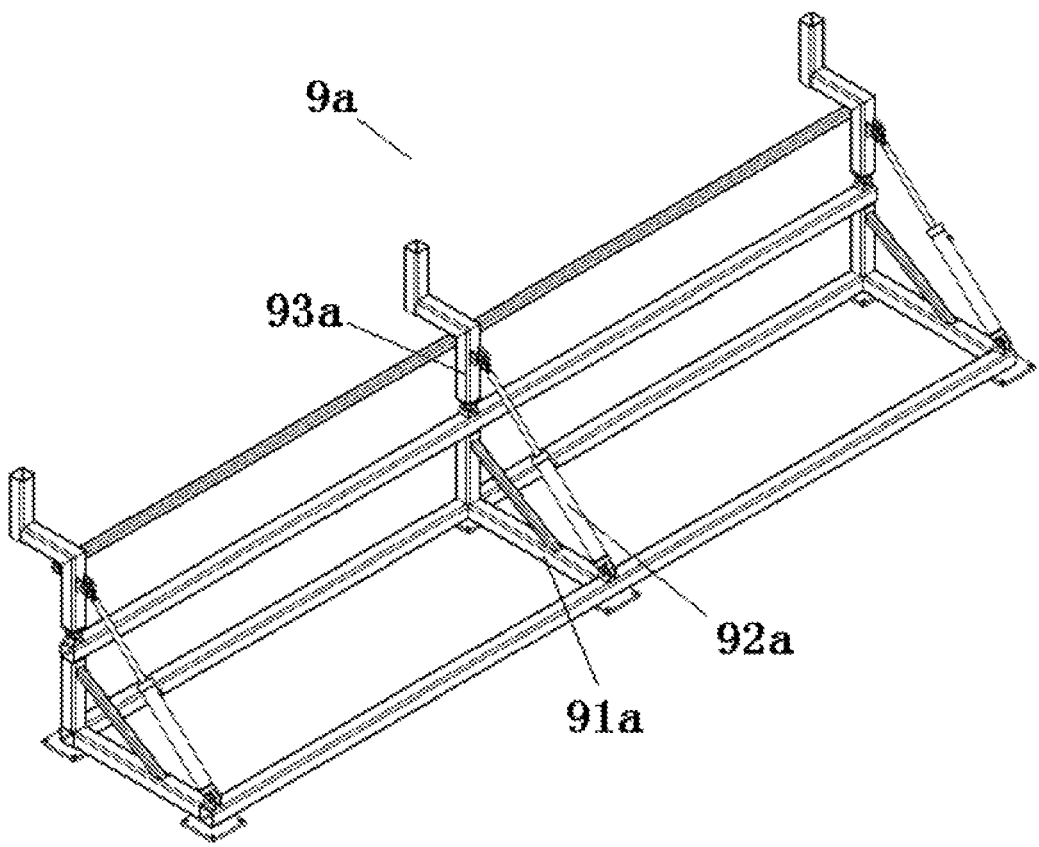
FIG. 6 is a simplified schematic diagram of the adjusting mechanism.

As illustrated in FIGS. 2 and 6, in other embodiments, the structures of the adjusting mechanisms 9a provided around the assembly station, i.e., the adjusting structures at one side or two adjacent sides can be simplified, and only the supporting frame 91 and the adjusting frame 93a driven by the hydraulic cylinder 92a to turn over are provided. The adjusting frame 93a is upturned and stopped outside the transverse boards or the longitudinal boards on the assembly station; moreover, there is no need to configure a movable adjusting block, and adjustment and alignment are performed by the adjusting blocks in the adjusting mechanisms at other three sides or the two adjacent sides.

Similarly, multiple movable adjusting blocks can also be provided in the presses 4 to adjust and align the assembled blocks fed into the presses 4 and then perform compaction, in order to avoid irregularity of the assembled boards caused by position shift generated during the delivery process.

The above are only preferred embodiments of the present invention. It should be noted that many modifications and variations can be made thereto for a person skilled in the art without departing from the technical principle of the present invention, and those modifications and variations should also be regarded as falling within the scope of protection of the present invention.

What is claimed is:

1. A cross-laminated timber processing equipment, comprising a longitudinal board loading mechanism, a transverse board loading mechanism, an adhesive spraying mechanism, multiple laying cars, multiple presses, and a transfer car and an unloading car moving along a transverse rail, wherein
a longitudinal rail is perpendicularly provided at one side of the transverse rail, and one end thereof is adjacent to the transverse rail; the longitudinal board loading mechanism and the transverse board loading mechanism are provided around the longitudinal rail; the multiple presses are arranged at the other side of the transverse rail; and an orifice of each press faces toward the transverse rail;
a conveying station and an unloading station are respectively located at both sides of multiple transversely arranged presses and at both ends of one transverse rail;
the longitudinal rail is provided with an assembly station; the longitudinal board loading mechanism lays longitudinal boards on a laying car at the assembly station, and the transverse board loading mechanism lays transverse boards on the laying car; and the longitudinal boards and the transverse boards are perpendicular to each other, and are alternately laid layer by layer for assembly;
the adhesive spraying mechanism is provided above the assembly station, and sprays an adhesive to an upper surface of each board during assembly;
the transfer car and the unloading car can be connected with the longitudinal rail when moving to a side of the longitudinal rail along the transverse rail, so that the laying cars can travel from the assembly station onto the transfer car along the longitudinal rail to be carried by the transfer car, or the laying cars carried by the unloading car travel out of the unloading car and enter the assembly station along the longitudinal rail;
the transfer car moves among the conveying station, the assembly station, and an idle press, and can carry the laying cars traveling out of the assembly station and assembled boards borne thereby to the idle press along the transverse rail, and feed the laying cars and the assembled boards into the press for compaction; and
the unloading car moves between a press completing compaction and the unloading station, and conveys an idle laying car after unloading the boards at the unloading station to the assembly station.

2. The cross-laminated timber processing equipment according to claim 1, wherein,
each laying car comprises a pallet and traveling wheels mounted below the pallet; and a lower surface of the pallet is provided with a longitudinal rack capable of engaging with a gear.

3. The cross-laminated timber processing equipment according to claim 2, wherein
a first gear driven by a first motor to rotate is provided below the assembly station; and the first gear can be engaged with the racks at the lower surfaces of the laying cars on the longitudinal rail.

4. The cross-laminated timber processing equipment according to claim 2, wherein
the transfer car/unloading car is respectively provided with a gear driven by a motor to rotate; and the gear can be engaged with the racks at the lower surfaces of the laying cars traveling into or out of the transfer car/unloading car.

5. The cross-laminated timber processing equipment according to claim 2, wherein
respective gears driven by respective motors to rotate are provided in each of the presses; and the gears can be engaged with the racks at the lower surfaces of the laying cars traveling into or out of the transfer car/unloading car.

6. The cross-laminated timber processing equipment according to claim 1, wherein
the transverse board loading mechanism is provided at the other end of the longitudinal rail, and the longitudinal board loading mechanism is provided at a side of the longitudinal rail.

7. The cross-laminated timber processing equipment according to claim 6, wherein
the longitudinal board loading mechanism comprises a stacking frame provided at a side of the longitudinal rail, and a prong capable of being driven by a driving device to move above the stacking frame and the assembly station; either end of the stacking frame is respectively provided with a stop plate at a side close to the assembly station; and the stop plates block the longitudinal boards stacked on the stacking frame, and spaces below the stop plates can allow only the lowermost longitudinal board to pass through.

8. The cross-laminated timber processing equipment according to claim 7, wherein
an upper surface of the stacking frame is provided with multiple lining bars; a space capable of allowing the prong to extend into is formed between the longitudinal boards stacked on the stacking frame and the upper surface of the stacking frame by means of the multiple lining bars.

9. The cross-laminated timber processing equipment according to claim 6, wherein
the transverse board loading mechanism comprises a conveyor belt located above a laving car at the assembly station, and the conveyor belt is capable of rotating while moving relative to the laying car at the assembly station.

10. The cross-laminated timber processing equipment according to claim 6, further comprising
an adjusting mechanism provided around the assembly station to adjust and align the longitudinal boards and/or the transverse boards.

11. The cross-laminated timber processing equipment according to claim 10, wherein
the adjusting mechanism comprises a supporting frame, and an adjusting frame hingedly connected to the supporting frame and capable of being driven by a first air cylinder or a first hydraulic cylinder to turn over.

12. The cross-laminated timber processing equipment according to claim 6, wherein
the longitudinal board loading mechanism comprises a conveyor belt and a longitudinal board moving frame; and a layer of longitudinal boards on the conveyor belt is vacuum-sucked up and moved by the longitudinal board moving frame and a manipulator having a vacuum chuck carried thereon to the laying car at the assembly station and then is released, so that the layer of longitudinal boards is horizontally laid on the laying car.

13. The cross-laminated timber processing equipment according to claim 1, wherein
the transverse board loading mechanism and the longitudinal board loading mechanism are provided at both sides of the longitudinal rail, respectively.

14. The cross-laminated timber processing equipment according to claim 13, wherein
at least one gantry spanning across the transverse board loading mechanism and the longitudinal board loading mechanism is mounted above the laying car at the assembly station on the longitudinal rail; a moving frame capable of moving along a rail on the gantry is provided on the gantry; manipulators capable of being driven by a driving mechanism to stretch or retract downwardly is carried on the moving frame; and front ends of the manipulators are provided with multiple vacuum chucks capable of absorbing the boards.

15. The cross-laminated timber processing equipment according to claim 14, wherein
one or two mobile frames are provided on the gantry for loading and assembling.

16. The cross-laminated timber processing equipment according to claim 15, wherein
when one mobile frame is provided, the mobile frame alternately moves between the longitudinal board loading mechanism and the laying car and between the transverse board loading mechanism and the laying car, and carries the manipulators having the vacuum chucks to alternately move the longitudinal boards on a longitudinal board laying platform and the transverse boards on a transverse board laying platform onto the laying car layer by layer for assembly of a cross-laminated timber (CLT).

17. The cross-laminated timber processing equipment according to claim 15, wherein
when two moving frames are provided, the two moving frames alternately move along the same rail or different rails of the same gantry, or alternately move along two rails on different gantries; one of the moving frames moves between the longitudinal board loading mechanism and the laying car, and the other moving frame moves between the transverse board loading mechanism and the laying car; and the manipulators having the vacuum chucks and carried by the moving frames alternately lay the longitudinal boards and the transverse boards on the laying cars layer by layer for assembly of the CLT.

18. The cross-laminated timber processing equipment according to claim 13, wherein
the transverse board loading mechanism comprises a transverse board laying platform and a conveyor belt located adjacent to the transverse board laying platform for conveying the transverse boards; a conveying manipulator having a vacuum chuck is provided at a joint between the transverse board laying platform and the conveyor belt; and the transverse boards on the conveyor belt are moved by the conveying manipulator to the transverse board laying platform.

19. The cross-laminated timber processing equipment according to claim 18, wherein
a starting end of the conveyor belt for conveying the transverse boards and/or the conveyor belt for conveying the longitudinal boards is provided with a loading manipulator for loading the transverse boards and/or the longitudinal boards onto the conveyor belt; and a front end of the loading manipulator is provided with multiple vacuum chucks.

20. The cross-laminated timber processing equipment according to claim 13, wherein
the longitudinal board loading mechanism comprises a longitudinal board laying platform and a conveyor belt located adjacent to the longitudinal board laying platform for conveying the longitudinal boards; a conveying manipulator having a vacuum chuck is provided at a joint between the longitudinal board laying platform and the conveyor belt; and the longitudinal boards on the conveyor belt are moved by the conveying manipulator to the longitudinal board laying platform.

21. The cross-laminated timber processing equipment according to claim 20, wherein
a starting end of the conveyor belt for conveying the transverse boards and/or the conveyor belt for conveying the longitudinal boards is provided with a loading manipulator for loading the transverse boards and/or the longitudinal boards onto the conveyor belt; and a front end of the loading manipulator is provided with multiple vacuum chucks.

22. The cross-laminated timber processing equipment according to claim 13, wherein
the longitudinal board loading mechanism comprises a conveyor belt and a longitudinal board moving frame; and a layer of longitudinal, boards on, the conveyor belt is vacuum-sucked up and moved by the longitudinal board moving frame and a manipulator having a vacuum chuck carried thereon to the laying car at the assembly station and then is released, so that the layer of longitudinal boards is horizontally laid on the laying car.

23. The cross-laminated timber processing equipment according to claim 1, wherein
the longitudinal board loading mechanism comprises a conveyor belt and a longitudinal board moving frame; and a layer of longitudinal boards on the conveyor belt is vacuum-sucked up and moved by the longitudinal board moving frame and a manipulator having a vacuum chuck carried thereon to the laying car at the assembly station and then is released, so that the layer of longitudinal boards is horizontally laid on the laying car.

24. The cross-laminated timber processing equipment according to claim 1, wherein
a jacking hydraulic cylinder or an air cylinder is further provided on the unloading car, and a stretchable rod of the jacking hydraulic cylinder or air cylinder moves vertically; and a pallet of the laying car is correspondingly provided with a through hole capable of allowing the stretchable rod to stretch out.

* * * * *